United States Patent [19]
Krejci et al.

[11] Patent Number: 5,545,713
[45] Date of Patent: Aug. 13, 1996

[54] PRIMER COATING, POLYESTER FILM HAVING A PRIMER COATING, AND A PROCESS FOR COATING FILM

[75] Inventors: James J. Krejci, Medina, Ohio; John M. Heberger, Greer, S.C.

[73] Assignee: Hoechst Celanese Corporation, Somerville, N.J.

[21] Appl. No.: 396,081

[22] Filed: Feb. 28, 1995

Related U.S. Application Data

[63] Continuation of Ser. No. 883,445, May 15, 1992, abandoned.

[51] Int. Cl.$^6$ ............................ C08G 63/68; C08G 75/00
[52] U.S. Cl. ........................ 528/295; 528/293; 528/294; 428/480; 428/483
[58] Field of Search ............................ 528/293, 294, 528/295, 480; 428/483, 480

[56] References Cited

U.S. PATENT DOCUMENTS

| | | |
|---|---|---|
| 3,563,942 | 2/1971 | Heiberger . |
| 3,779,993 | 12/1973 | Kibler et al. . |
| 4,181,528 | 1/1980 | Work et al. . |
| 4,252,885 | 2/1981 | McGrail et al. . |
| 4,304,851 | 12/1981 | McGrail et al. . |
| 4,394,442 | 7/1983 | Miller . |
| 4,476,189 | 10/1984 | Posey et al. . |
| 4,493,872 | 1/1985 | Funderburk et al. . |
| 4,525,419 | 6/1985 | Posey et al. . |
| 4,585,687 | 4/1986 | Posey et al. . |
| 4,745,019 | 5/1988 | Posey et al. . |
| 4,888,381 | 12/1989 | Ponkratz ........................ 528/305 |

FOREIGN PATENT DOCUMENTS

| | | |
|---|---|---|
| 1088984 | 10/1967 | United Kingdom . |
| 1264338 | 2/1972 | United Kingdom . |

OTHER PUBLICATIONS

Japanese Laid–Open Patent Application (Kokai) No. 3–265843 Nov. 26, 1991 "A Polyester Film for Photosensitive Materials and a Method for Manufacturing Said Film" (copy of original document and copy of complete English translation).

Primary Examiner—James J. Seidleck
Assistant Examiner—Doc Truong
Attorney, Agent, or Firm—G. N. Clements

[57] ABSTRACT

A polyester film coated with a novel primer coating and overcoated with one or more gelatin-aziridine coatings makes an excellent photographic film. The primer coating has about 85–90% by weight of a water-dispersible copolyester and about 1–15% by weight of an anionic surfactant. The water-dispersible copolyester contains about 80–98 mol % of at least one dicarboxylic acid or its ester equivalent; about 1–20 mol % of a sulfomonomer containing a sulfonate group attached to a dicarboxylic nucleus; and about 100 mol % of at least one glycol having 2–11 carbon atoms. The gelatin-aziridine coating contains about 0.5 to 100% by weight of aziridine, based on the weight of the gelatin. The gelatin-aziridine coating is sufficient to provide adhesion to or serve as a photographic gelatin coating and the aziridine being sufficient to bond the gelatin to the primed film. The gelatin-aziridine coating may constitute a single uniformly blended layer, or separate layers of gelatin and of aziridine with each layer diffused into the other. A process for producing a film useful as a photographic substrate is also disclosed.

15 Claims, No Drawings

PRIMER COATING, POLYESTER FILM HAVING A PRIMER COATING, AND A PROCESS FOR COATING FILM

This is a continuation of application Ser. No. 07/883,445 filed on May 15, 1992, now abandoned.

BACKGROUND OF THE INVENTION

1) Field of the Invention

The present invention relates to a primer coating for a polyester film to be primarily employed as a photographic film. The primer coating composition is applied to at least one side of a polyester film to improve the bonding between the film and one or more gelatin layers. The primer coating consists of a copolyester composition which is water-dispersible and an anionic surfactant. It has been found that this primer coating composition is excellent for use in photographic films and yields superior adhesion performance over known aqueous-based photographic films. It has also been found that the primer coated film may be employed for non-photographic uses such as for diazo film, copier film, and drafting film.

The present invention also relates to a primed film with a novel gelatin/aziridine coating which is compatible with a light sensitive photographic composition. The gelatin/aziridine coating not only bonds well with the primer coating mentioned above, but also bonds to a light sensitive photographic composition. The primary purpose of the aziridine is to adhere a gelatin layer to the primer coating. Without the primer coating of the present invention, the gelatinous/aziridine coating would not satisfactorily bond to the polymeric film.

2) Prior Art

Photographic films are well known and are conventionally based on polyester substrates. Water soluble coatings applied to polyester films achieve adhesion between the polymeric film and one or more gelatin coatings. These films employ a water dispersible copolyester primer coating composition comprising a polyester portion and a sulfomonomer portion.

U.S. Pat. No. 4,394,442 to Miller, discloses a photographic film having a polyester film base with a water soluble copolyester primer coating and overcoated with a gelatin containing layer. The copolyester layer includes a sulfonated monomer pendant from a dicarboxylic nucleus of the type described herein.

U.S. Pat. No. 4,181,528 to Work, III et al discloses improved adhesion of a photographic emulsion to a polyester film base in which the primer coating contains a water soluble polyester, a gelatin, and a polyfunctional aziridine. It is contemplated that this primed polyester film is then suitable for application of a photographic gelatin layer. The primer coating is applied off-line (not during the manufacturing process for forming the polyester film). Additionally, the primed film does not always pass the wet-adhesion test that is necessary to have a suitable photographic film.

Other U.S. Pat. Nos. 4,252,885 and 4,304,851 issued to McGrail et al disclose a light sensitive photographic film produced by coating polyester films with an aqueous dispersion of copolyesters. The photographic film disclosed is directly adherable to photographic emulsions or other gelatin-containing layers.

British Patent 1,264,338 discloses an in-line coated polyester film (coated during the manufacturing process of the film) for photographic films in which a water-dispersible copolyester primer coating may be applied. In particular, this reference mentions those water dispersible polymeric based coatings described in the following British patent.

British Patent 1,088,984 discloses a treatment of polyester film by coating it in-line with a water dispersible copolyester containing a sulfomonomer group.

U.S. Pat. No. 4,493,872 to Funderburk et al (assigned to the present assignee) discloses a water-dispersible copolyester primer coating which may be applied to a polymeric film such as polyamides, polyolefin, polysulfones, polyacetal, polycarbonate and polyester (such as polyethylene terephthalate). As disclosed by this reference, the copolyester coating composition, when applied to a polymeric support, provides excellent adhesion between the polymeric support and a subsequently applied metallic coating. The copolyester primer coating consists of one or more dicarboxylic acids and at least one sulfomonomer containing a sulfonated group attached to a dicarboxylic aromatic nucleus.

Other patents assigned to the present assignee which also disclose a water soluble or water-dispersible copolyester, comprising one or more dicarboxylic acids and at least one sulfomonomer containing a sulfonate group attached to a dicarboxylic aromatic nucleus are U.S. Pat. No. 4,476,189; U.S. Pat. No. 4,525,419; U.S. Pat. No. 4,585,687; and U.S. Pat. No. 4,745,019, all of which are issued to Posey et al. These patents disclose various dicarboxylic acids which are different from those set forth in Funderburk et al.

Although several of the prior art references mention water dispersible copolyester primer coatings, and other references disclose that such coatings are suitable for photographic usage, there continues to be a need for an improved photographic film employing aqueous based coatings.

It is an aspect of the present invention to provide a suitable aqueous based primer coating composition for photographic film, as well as for non-photographic applications such as diazo films, copier films, drafting films, etc.

It is an object of the present invention to provide a polyester film coated with the primer coating composition described herein, which would be suitable for one or more photographic gelatinous layers.

Another aspect of the present invention is to provide a photographic film in which a polyester substrate having the primer coating composition of the present invention applied thereon and one or more gelatinous layers, including a light sensitive or photographic gelatinous layer, is commercially viable.

It is an object of the present invention to provide a process for priming a photographic film with the primer coating composition of the present invention to provide adequate adherence between the polyester film and one or more gelatinous layers for photographic usage.

SUMMARY OF THE INVENTION

In keeping with the foregoing aims, objects and aspects of the present invention, the primer coating composition, the primer coated film, and the process of the present invention are disclosed such that those skilled in the art are capable of making and using the same. Generally, the primer coating composition of the present invention comprises a mixture of an anionic surfactant and a water-dispersible copolyester. The copolyester is produced by reacting at least one sulfomonomer containing a sulfonate group attached to a dicarboxylic nucleus and one or more dicarboxylic acids or esters thereof, along with a suitable amount of glycol.

In the broadest sense of the present invention, a primer coating composition comprising a water dispersible copolyester and an anionic surfactant are uniformly mixed to produce a primer coating for polymeric films employed for photographic as well as non-photographic uses. The primer coating composition comprises, before dilution, from about 1.0 to about 15% by weight anionic surfactant, and from about 85% to about 99.0% by weight copolyester, wherein said copolyester comprises: from about 80 mol % to about 98 mol % of at least one dicarboxylic acid, or the ester of the acid, and from about 2 to about 20 mol % of at least one sulfomonomer containing a sulfonate group attached to a dicarboxylic nucleus; and about 100 mol % of at least one glycol having from about 2 to 11 carbon atoms. Of course, the actual primer coating composition can only be described in the broad ranges specified above, because exact ranges depend on the specific type of anionic surfactant employed. Generally, each type of anionic surfactant has its own useful range of effectiveness. While most anionic surfactants are not effective below 1% by weight, occasionally there may be an anionic surfactant which is effective below 1% by weight, depending upon the amounts of other components in the primer coating. While 15% by weight of the primer coating composition is specified as the maximum amount of anionic surfactant, the actual maximum amount of anionic surfactant is most likely more a practical matter than an actual weight percent. In other words, using more than is necessary is an economic consideration rather than a limit on the primer coating composition.

The broadest sense of the present invention also contemplates coating compositions for primed, heat set polyester films wherein said coating compositions include either:

1) a uniformly blended aziridine/gelatin coating where the gelatin is either a subbing composition or a light-sensitive photographic composition containing gelatin; or 2) separate coatings of aziridine and gelatin wherein the gelatin is either a subbing composition or a light-sensitive photographic composition containing gelatin, wherein the separate layers of aziridine and gelatin may be applied in any order; and wherein the aziridine is employed in amounts sufficient to adhere the layer or layers to the primed film.

The broadest sense of the present invention also contemplates a polyester film having an effective amount of a primer coating thereon to bond to one or more gelatinous photographic layers, said effective amount of said primer coating, before dilution, comprising from about 1% to about 15% by weight of anionic surfactant, and from about 85% to 99% by weight copolyester, wherein said copolyester comprises: from about 80 mol % to about 98 mol % of at least one dicarboxylic acid, or the ester equivalents; from about 2 to about 20 mol % of at least one sulfomonomer containing a sulfonate group attached to a dicarboxylic nucleus; and about 100 mol % of at least one glycol having from about 2 to 11 carbon atoms.

The broadest sense of the present invention also contemplates a photographic film comprising a polyester support, an effective amount of a primer coating composition applied thereto, and one or more photographic gelatinous coatings applied upon said primer coating, said primer coating composition comprising, before dilution, from about 1% to 15% by weight of anionic surfactant, and from about 85% to 99% by weight copolyester, wherein said copolyester comprises: from about 80 mol % to about 98 mol % of at least one dicarboxylic acid, or the ester equivalents; from about 2 to about 20 mol % of at least one sulfomonomer containing a sulfonate group attached to a dicarboxylic nucleus; and about 100 mol % of a glycol having from about 2 to 11 carbon atoms; and wherein said photographic gelatinous coatings include 0.5% to 100% by weight of a polyfunctional aziridine, based upon the amount of gelatinous coating applied.

In the broadest sense of the present invention it is also contemplated that a process for priming a photographic film with an effective amount of a primer coating thereon to bond one or more photographic gelatinous layers comprises: priming a polyester film with an effective amount of a primer coating composition comprising, before dilution, from about 1% to about 15% by weight of anionic surfactant, and from about 85% to about 99% by weight of a copolyester, wherein said copolyester comprises: from about 80 mol % to about 98 mol % of at least one dicarboxylic acid, or the ester equivalents; from about 2 to about 20 mol % of at least one sulfomonomer containing a sulfonate group attached to a dicarboxylic nucleus; and about 100 mol % of at least one glycol having from about 2 to 11 carbon atoms; drying said primer coating; heating setting said primed film; and applying either:

1) a uniformly blended aziridine/gelatin coating, where the gelatin is either a subbing composition or a light-sensitive photographic composition containing gelatin; or 2) separate coatings of aziridine and gelatin, applied in any order, wherein the gelatin is either a subbing composition or a light-sensitive photographic composition containing gelatin.

When the gelatin is a subbing layer, eventually a light-sensitive photographic gelatin coating is applied.

DESCRIPTION OF THE PREFERRED EMBODIMENTS

The present invention is applicable to any polyester film which has photographic film uses as well as non-photographic uses such as reprographic film. Polyethylene terephthalate is the preferred polyester. The present invention may also utilize copolyesters such as polyethylene terephthalate isophthalate. Generally, any polyester film based on a polymer resulting from the polycondensation of a glycol or diol with a dicarboxylic acid (or the ester equivalents) such as terephthalic, isophthalic, sebacic, malonic, adipic, azelaic, glutaric, suberic, succinic, and the like, or mixtures of these, can be employed in the present invention. Suitable glycols such as ethylene glycol, diethylene glycol, polyethylene glycol, neopentyl glycol, and polyols such as butanediol, and the like, are suitable.

Any of the above polymeric films can contain conventional additives such as antistatic additives, fillers such as silica, calcium carbonate, kaolin, titanium dioxide, pigments, delusterants, etc., all of which are well known in the art.

Additionally, the polymeric film may comprise a polymeric laminate such as a polymer-polymer laminate like polyester-polyolefin, for example, or a polymer-metallic laminate such as polyester-aluminum, or a polymeric paper laminate, or the like.

The films may be produced by any well known techniques in the art. For example, polyester is typically melted and extruded as an amorphous sheet onto a polished revolving casting drum to form a cast sheet of the polymer. The sheet is quickly cooled and stretch oriented in one or more directions to impart strength and toughness to the film. Stretching typically occurs in a range of 2 to 4 times the original cast sheet dimensions in one or both directions. Generally, stretching occurs in a temperature range from about the second order transition temperature of the polymer to below the temperature at which the polymer softens and melts. Where necessary, the film is heat treated after stretching to "lock-in" the properties by further crystallizing the film. The crystallization imparts stability and good tensile properties to the film. Such heat treatment for polyester films is generally in a range between 190° C. to 240° C.

With respect to the primer coating composition of the present invention, it consists of two parts, namely an anionic surfactant and a water dispersible copolyester. Suitable anionic surfactants include sodium lauryl sulfate, sodium dodecylbenzene sulfonate, and sodium alkylarylpolyether sulfonate.

With respect to the copolyester portion of the primer coating composition, it may generally be prepared as described in U.S. Pat. No. 4,493,872 to Funderburk et al, except that the percentage of the copolyester components in the present invention is broader than is set forth by Funderburk et al. Moreover, the sulfomonomer group of the present invention is not limited to an alkali metal sulfonate group as disclosed in the Funderburk et al patent. The sulfomonomer group of the present invention may comprise any sulfomonomer in which the sulfonate group is attached to a dicarboxylic nucleus. It is noted that the Funderburk et al patent has as a lower limit for the sulfomonomer group of about 5 mol % to impart water dispersibility to the primer. With the present invention, it is believed that a slightly lower amount of sulfomonomer may be employed. Furthermore, the present invention also enjoys a slightly broader range of dicarboxylic acids or the ester equivalents.

Sulfomonomers suitable for the present invention are generally represented by the formula:

$$X-Z-Y$$
$$|$$
$$SO_3M$$

wherein M is a monovalent cation that may be selected from the group of alkali metals, ammonium, substituted ammonium and quaternary ammonium; Z is a trivalent radical; and X and Y are carboxyl groups or polyester forming equivalents. Sulfomonomers wherein Z is aromatic, are disclosed in U.S. Pat. Nos. 3,563,942 and 3,779,993 and are incorporated herein by reference. Species of such monomers include sodium sulfoterephthalic acid; ammonium sulfoterephthalic acid; sodium 5-sulfoisophthalic acid; ammonium 5-sulfoisophthalic acid, sodium sulfophthalic; ammonium sulfophthalic acid; 5-(p-sodiosulfophenoxy)-isophthalic acid; 5-(sulfopropoxy)isophthalic acid, sodium 5-(sodiosulfopropoxy)-isophthalic acid; and like materials, as well as their polyester forming equivalents, such as the dimethyl esters.

Sulfomonomers wherein Z is aliphatic, are disclosed in U.S. Pat. No. 3,734,874 incorporated herein by reference. Other examples of aliphatic sulfomonomers are sulfonated aliphatic dicarboxylic acids (or their ester equivalents) wherein the sulfonated group bonds to a trivalent alkyl group. Examples are sulfopropyl malonic acid.

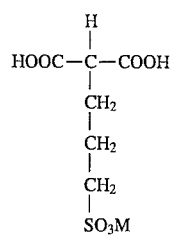

where ZCH—CH—CH$_2$—CH$_2$ and sulfonated succinic acid,

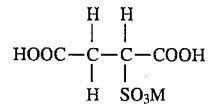

where Z═CH$_2$—CH, etc.

Examples of suitable dicarboxylic acids or their ester forming equivalents, include phthalic acid, isophthalic acid, terephthalic acid, malonic, adipic, azelaic, glutaric, sebacic, suberic, succinic, brassylic acids and mixtures thereof.

Examples of suitable glycols include ethylene glycol; diethylene glycol; butanediol, 1,5-pentanediol; 1,6-hexanediol; neopentyl glycol; 1,10-decanediol; cyclohexane dimethanol; and similar materials. Ethylene glycol is the preferred glycol.

The proportion of the anionic surfactant to the copolyester may be in a range from about 1% to 15% by weight anionic surfactant, and from 85% to 99% by weight of the copolyester. Although the scope of the present invention is intended to cover even broader ranges than these, it is noted that these ranges give better results. For example, more anionic surfactant may be added, however, adhesion will not significantly improve. On the other hand, less anionic surfactant may be added and the formulation may be suitable, however, the primer composition will not universally perform as well as the present range. The preferred range of the components is 2 to 3% by weight of the anionic surfactant, and from 97 to 98% by weight of the water dispersible copolyester. The components are uniformly blended with one another to produce the primer coating of the present invention.

The primer coating of the present invention is typically applied to the base film as an aqueous dispersion and at a solids concentration within the range of about 0.5 to 15% by weight, preferably from about 5 to 10% by weight. The preferred solids level, as it is applied to the polymeric substrate, is such as to yield a final dry coating thickness within the range of from about 0.003 g/m$^2$ to 0.5 g/m$^2$. The preferred range is from 0.005 to 0.2 g/m$^2$. The preferred thickness range of the dried primer coating is from about $1 \times 10^{-7}$ to $1 \times 10^{-4}$ inch, with $1 \times 10^{-6}$ inch being the target thickness.

The primer coating may be applied to the polymeric substrate by any known method. For example, roll coating, reverse roll coating, gravure roll coating, reverse gravure roll coating, brush coating, spray coating, air knife coating, dipping, slot, slide curtain, or meniscus coating may be employed.

The primer coating may be applied to one or both sides of the film, depending on its final application. For example, in those situations where it is desirable to have adhesion to both sides of the polyester film for a photographic film usage, the film may be coated on each side with a primer coating and then overcoated with the necessary gelatinous layers, including the light-sensitive photographic gelatinous layer.

With respect to the primer coating composition of the present invention, certain advantages exist over other water dispersible primer coating compositions and over commonly used chlorine containing polymer compositions. For example, the primer coating composition of the present invention, when applied to a polyester film, can be recycled with virgin polyester without causing degradation of the film, i.e., without any sacrifice in the physical characteristics of the film as well as the general appearance remaining clear and with acceptable color.

In-line coating of the polyester film (where the primer coating is applied during the manufacturing process of the film before it is heat set) is necessary for applying the primer coating to the polyester film. Typically, the polyester film may be coated with or without corona treatment and prior to stretch orientation of the film as described in British Patent No. 1,411,564, or coated interdraw in those production methods in which a biaxially oriented polymeric film is employed, is taught by U.S. Pat. No. No. 4,571,363, or coated postdraw but before heat setting as taught by U.S. Pat. No. 3,322,553.

It is contemplated that the various gelatinous layers are coated after the polyester film has been heat-set, as is generally known in the photographic film arts.

While surface modification of the polyester film is not required, with some primer coating compositions better results are obtained if the surface of the polymeric film is modified immediately before the application of the primer coating of the present invention. Conventional well-known surface modification techniques are known, such as corona treatment, flame treatment, or chemical treatment. Corona treatment is the most common and preferred procedure for modifying the surface of the polymeric substrate in those instances where better results are obtained. The corona treatment, or other surface modifications should be sufficient to permit wetting out of the primer coating on the polyester film substrate. For corona treatment, this is generally on the order of 5.0 watts per square foot per minute.

To produce a photographic film, the primer coated film of the present invention must be overcoated with one or more gelatinous layers. Various gelatinous compositions for photographic film use are well known in the art and may consist of porkskin gelatin based composition, bone gelatinous compositions, etc. Suitable photographic gelatinous compositions are typically made by Croda Company, Rousselot Company, Kind & Knox Co. and many others.

Coating the primed film with the gelatin overcoating occurs generally after the film has been heat set. The overcoated gelatin composition can be applied by any of the methods described regarding the primer coating.

To adhere the various gelatinous layers to the primer coated film of the present invention, it is necessary that a polyfunctional aziridine be employed. Commercially known polyfunctional aziridines are available from the Hoechst Celanese Corporation and may take the form of trimethylolpropane-tris-(B-(N-aziridinyl) propionate)

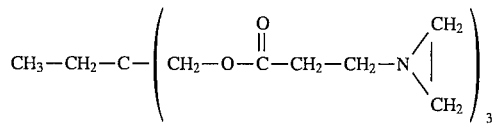

and pentaerythritol-tris-(B-(N-aziridinyl) propionate)

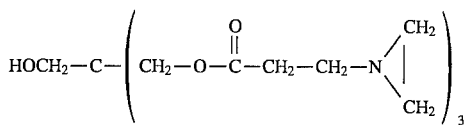

and the like. These polyfunctional aziridines function as low energy crosslinkers and adhesion promoters. The amount of aziridine to be employed with the photographic gelatinous compositions is from about 0.5 to 100% by weight, based on the weight of the gelatin, preferably from about 1% to about 5% by weight based on the weight of the gelatin employed. The aziridine functions to adhere the gelatin layer to the primer coating composition. Generally the aziridine gelatinous layer is applied in the range of about 0.1 to 0.6 g/m$^2$ (grams per meter squared). The various gelatinous layers, including the light-sensitive photographic gelatinous layer are conventional and commercially available, and thus the present invention does not rely on the specifics of such compositions for patentability.

The general process employed for the present invention comprises: in-line coating the polymeric film with the primer coating either before, during, or after drawing the film, but before heat setting; drying the primed film; and overcoating the primed film after heat setting with one or more gelatinous layers, including a light-sensitive photographic gelatinous layer, in which the gelatinous layer in contact with the primer coating contains aziridine or an aziridine layer is applied thereon before the gelatinous composition is applied. For example, a polyester film substrate can be coated with the primer coating of the present invention and overcoated:

1) with a gelatinous/aziridine mixture and again overcoated with a light-sensitive photographic gelatinous layer; or 2) overcoated with a gelatinous layer, then overcoated with an aziridine layer, and lastly overcoated with a light-sensitive photographic gelatinous layer; or 3) overcoated with an aziridine layer, overcoated with a gelatin subbing layer, and overcoated with a light-sensitive photographic gelatin layer; or 4) overcoated with an aziridine layer, and overcoated with a light-sensitive gelatin layer; or 5) overcoated with a light-sensitive photographic gelatinous/aziridine blend layer.

In all the above examples, the aziridine functions to adhere the gelatinous component to the primer. Additionally, in the first three examples, the light-sensitive photographic gelatinous layer is bonded to the gelatin subbing layer through a gelatin-gelatin bonding mechanism. In the last two examples, there is no gelatin-gelatin bonding and the gelatin in the light-sensitive photographic layer merely bonds directly to the primer coating through the aziridine.

The subbing layer of gelatin or gelatin/aziridine applied to the primed film, on a dry weight basis, is at least about 0.05 g/m$^2$. The percentage gelatin in the subbing generally varies between 1 and 3% by weight solids. The actual percentage of gelatin employed is based on ease of handling, streaks, leveling of coating, etc. Those skilled in the art recognize that the dry thickness of the gelatin coating relates to the percentage of gelatin employed. The gelatin layer can be a Type A, acid processed gelatin such as pork skin based, or a Type B, lime processed gelatin such as bone based. The light-sensitive layer is almost always based on the Type B gelatin. Typically the light-sensitive gelatin contains a light-sensitive composition based on silver halide. General compositions for light-sensitive gelatin composition are set forth in the SPSE Handbook of Photographic Science and Engineering, published by John Wiley & Sons, by Woodlief Thomas, Jr., Editor, pages 515–519.

GENERAL CONDITIONS

For determining the suitability of the film of the present invention for photographic uses, three adhesion tests are performed. The first of three tests is dry adhesion of unprocessed photographic layers. In this test, the samples of the primed polyester film are coated with one or more subbing layers and are overcoated with a Photographic Test Coating. Each subbing layer and the Photographic Test Coating is dried before further processing. The samples are then torn to expose a rough edge. A piece of no. 810 Scotch tape is placed over the torn edge and pulled away sharply. If no removal of the various coatings occur, the sample is ranked Grade 1. If limited removal in small pieces occurs, the sample is rated Grade 2. If removal greater than or equal to the tape area occurs, the sample is ranked as a Grade 3. Only Grade 1 is considered acceptable.

The second important adhesion test is called the wet adhesion of processed photographic layers. Samples of the primed and gelatin subbed coated film are subsequently coated with a Photographic Test Coating and are processed through the following sequences of photo processing chemicals, namely:

1) submerged in developer for 2.5 minutes;
2) rinsed with water for 30 seconds;
3) submerged in a fixer for 1.5 minutes; and
4) rinsed with water for 3 minutes.

The temperature of the water rinse in both steps 2 and 4 is ambient. The developer employed was Reprolith 200, a commercially available developer produced by Anitec Image Corporation. The fixer was Repromatic 160, a commercially available fixer made by Anitec Image Corporation. At the end of the four steps, the sample is scored with a scribing tool and a rubber stopper is rubbed across the sample several times, using a 2 kilogram weight of pressure. Samples are examined for degree of failure. No removal of the test coating beyond the score line is Grade 1, very limited removal is Grade 2, and general loss of the coating is Grade 3.

The third adhesion test is called the processed dry adhesion. Samples of the primed and gelatin subbed film are overcoated with a Photographic Test Coating and processed through the same four sequence steps as mentioned for wet adhesion. After drying the film for 15 minutes at 40° C., adhesion is tested by taping a torn edge with a piece of No. 810 Scotch tape as is described with respect to the dry adhesion test of unprocessed photographic layers. The same ratings apply for this test as with the dry and wet adhesion tests mentioned previously.

For the following Examples, the polymeric film was produced with an unfilled polyethylene terephthalate resin made by the Hoechst Diafoil Corporation. In all samples, except Sample 5, a corona treatment of the film was done prior to the primer coating. The various primer coatings of the Examples were applied interdraw and were applied to the polyester film to give a dry coating weight in the range from 0.05 to 0.2 g/m$^2$. For the various gelatin/aziridine subbed layers, the dry coating weight was approximately 0.25 g/m$^2$. For the Photographic Test Coating the thickness was about 5 g/m$^2$.

Aziridine has a very short pot life in aqueous systems. Aziridine adheres the adjacent gelatinous layer to the primer coated film, irrespective of the sequence of application, i.e., whether the gelatin and aziridine are applied simultaneously or one before the other. The primer coated film is always heat set before the application of any aziridine or gelatinous layer.

The present invention does not depend on the exact Photographic Test Coating composition. Typical photographic test coatings can be obtained from the SPSE Handbook of Photographic Science and Engineering, published by John Wiley & Sons, and edited by Woodlief Thomas, Jr., pages 515–519. The Photographic Test Coating employed in all Examples was the same composition.

EXAMPLE 1

An amorphous, unfilled PET film was stretched 3.5 times the original length in the machine direction, corona treated, and coated with 0.25 g/m$^2$ dry weight of a primer coating comprising a copolyester and an anionic surfactant. The copolyester composition comprised, on a dry weight basis, 73 mol % terephthalic acid, 20 mol % adipic acid, 7 mol % 5-sodium sulfoisophthalate, and 100 mol % of ethylene glycol. This copolyester composition is referred to as Copo A. The primer coating composition was then diluted with 9 parts distilled water and 1 part of the copolyester composition. To this composition, 2½% by weight of sodium dodecylbenzene sulfonate and 4% by weight of colloidal silica were added on a dry weight basis of the copolyester resin. After primer coating, the film was stretched to about 3.8 times the original width in the transverse direction and heat set between 190° C. to 240° C.

The primed film was subsequently coated to a dry coating weight of 0.25 g/m$^2$ with the following aqueous gelatin/aziridine composition on a 30-inch wide reverse gravure coater and dried with hot air at 250° F. For Examples 1, 2, and 3, the aqueous gelatin/aziridine composition comprised:

2% by weight gelatin (Kind & Knox Company Type A gelatin);

0.14% Triton X-200 (a sodium alkylarylpolyether sulfonate anionic surfactant);

0.06% Xama-7, a polyfunctional aziridine; and 0.002% Syloid 244-X 1517 (a colloidal silica)

with the balance being deionized water and the pH of the solution being adjusted to 9.5 with aqueous ammonia.

To test the performance of the primed and subbed film, a test coating with a composition typical of non-curl or antihalation backing layer used in the photographic arts (the "Photographic Test Coating") was applied with a #23 Meyer Rod. The coated film was air dried and cured in a 50° C. oven for 1 hour before performing the three adhesion tests. The results are set forth in Table 1.

For Sample 2, the same primer coating formulation was prepared, except that 10% by weight of a melamine formaldehyde resin (hexamethoxymethyl melamine known as CYMEL® 303, commercially produced by American Cyanamid), used as a crosslinker and 0.7% by weight of a fluorosufactant type FC-170C (from 3 M Corporation) based on the dry weight of the copolyester were added. Sample 2 was also tested under the three adhesion tests. The results are reported on Table 1.

Table 1 shows that the use of a crosslinking agent like CYMEL® 303 is not necessary.

EXAMPLE 2

Samples 3–16

In Sample 3, the primer coating composition was coated onto unfilled polyester film as described with respect to Example 1. The primer coating composition comprised 10% by weight of an alternate copolyester and 90% by weight distilled water. The copolyester comprised 90% isophthalic acid and 10% 5-sodium sulfoisophthalate with 100 mol % ethylene glycol. This alternate copolyester composition is referred to as Copo B. Based upon the dry weight of the copolyester, 2.5% by weight of sodium dodecylbenzene sulfonate, and 4% by weight colloidal silica, were added to the primer coating. The results of testing Sample 3 are set forth in Table 1.

For Sample 4, the primer coating formulation of Sample 3 was again prepared, except the addition of 10% of CYMEL® 303 and 0.7% of a fluorosurfactant FC-170° C., based upon the dry weight of the copolyester were added. Sample 4 is the standard formulation and is preferred. The results of tested Sample 4 are listed in Table 1.

For Sample 5, the same primer coating of Sample 4 was employed. The polyester film was not corona treated prior to the application of the primer coating. The results of testing Sample 5 are set forth in Table 1.

In Sample 6, the primer coating composition of Sample 4 was employed except that 1% by weight of the anionic surfactant sodium dodecylbenzene sulfonate based upon the dry weight of the copolyester was employed instead of 2.5% by weight. The results of Sample 6 are reported in Table 1.

With respect to Sample 7, the primer coating formulation was identical to Sample 4 except no anionic surfactant was employed. The results are set forth in Table 1.

With respect to Sample 8, the same primer coating formulation as Sample 4 was employed except that 2½% of sodium lauryl sulfate was employed instead of the anionic surfactant sodium dodecylbenzene sulfonate. The results of the Sample 8 primer coated film are set forth in Table 1.

Sample 9 employed the same primer coating composition as set forth in Sample 4 except a different melamine formaldehyde resin was employed in place of CYMEL® 303. In this Sample, 10% by weight (based on the dry weight of the copolyester) of a commercially available melamine formaldehyde resin sold under the trade name Resimene® 717 was employed. Resimine 717 is a melamine formaldehyde resin highly alkylated with a high imino content. The results are listed in Table 1.

Sample 10 is identical to Sample 4 except the crosslinker of CYMEL® 303 was replaced by a different commercially available crosslinker commercially known as Resimene® AQ-7550. Resimene AQ-7550 is a melamine formaldehyde resin partially alkylated with a high methylol content. The results of this primer coated film are set forth in Table 1.

Samples 11, 12 and 13 have a primer coating composition similar to that of Sample 4 except that the amount of CYMEL® 303 employed was varied. In Sample 11, the amount employed was 1% by weight (based on the dry weight of the copolyester). In Sample 12, the amount of CYMEL® 303 employed was 5.0% by weight, and in Sample 13, the amount of CYMEL® 303 employed was 15% by weight. The results of these primed films are set forth in Table 1.

Samples 14, 15 and 16 are similar to Sample 4 except that the amount of copolyester composition employed was varied. In Sample 14, a 1% solution of the copolyester was employed, with 99% by weight distilled water. In Sample 15, 5% by weight of the copolyester was employed with 95% by weight of distilled water. And in Sample 16, a 15% by weight copolyester composition with 85% by weight distilled water was employed. The percentage of the remaining components of the anionic surfactant, the fluorosurfactant, the crosslinker, and the colloidal silica remained the same. The results of these primer coated compositions are set forth in Table 1.

Comparing Sample 3 with Sample 4 of Example 2, and comparing Sample 1 and Sample 2 of Example 1, some copolyester compositions may perform best with a crosslinker, while other copolyester coating compositions do not need the addition of a crosslinker.

Sample 5 indicates that no corona treatment is necessary to accomplish the results of the present invention.

Sample 6 shows that a low level of anionic surfactant or no surfactant (in the case of Sample 7) give poor results with the present invention.

Sample 8 shows that alternative anionic surfactants give good results.

Samples 9 and 10 show that alternative crosslinkers, where needed, also give good results. Samples 11, 12 and 13 show that with respect to copolyester of Sample 4, the level of crosslinker has an effect on the outcome of the adhesion tests, particularly the dry adhesion and process dry adhesion tests.

Samples 14, 15 and 16 show that at least 1% by weight on a dry weight basis of the copolyester of Sample 4 was approximately the minimum amount that can be employed and that 5% and 15% by weight on a dry weight basis of copolyester of Sample 4 all enjoy the same good results.

EXAMPLE 3

In Example 3, yet another alternate copolyester composition was employed. In Sample 17, the exact same percentages of all the components set forth in the standard formulation (Example 2, Sample 4) were employed, except that the 10% by weight copolyester was replaced with 10% by weight of an alternate copolyester. The alternate copolyester comprised 34 mol % terephthalic acid, 52 mol % isophthalic acid, and 14 mol % 5-sodium sulfoisophthalic acid. The glycol component of the copolyester comprised 32 mol % ethylene glycol, 12 mol % diethylene glycol, 46 mol % neopentyl glycol, and 10 mol % neopentyl-ethylene glycol. This alternate copolyester is referred to as Copo C.

Sample 18 is similar to Sample 17, except that no CYMEL 303 crosslinking agent nor the associated fluorosurfactant was employed. The results of Samples 17 and Sample 18 in Example 3 are set forth in Table 1.

Sample 17 shows in Table 1, that the two dry adhesion tests were acceptable. However, the wet adhesion test was unacceptable. With respect to Sample 18, in which no crosslinker was employed, none of the tests was acceptable.

Samples 17 and 18 showed that certain alternate copolyester compositions may not give acceptable results, particularly wet adhesion results.

TABLE 1

| EXAMPLE | SAMPLE NO | FORMULATION | DRY ADHESION | WET ADHESION | PROCESSED DRY ADHESION |
|---|---|---|---|---|---|
| 1 | 1 | 10% Copo A + 2.5% SDS + 4% C. Sil | 1 | 1 | 1 |
| 1 | 2 | 10% Copo A + 2.5% SDS + 4% C. Sil + 10% Cymel 303 + 0.7% Fl-Surf. | 1 | 1 | 1 |
| 2 | 3 | 10% Copo B + 2.5% SDS + 4% C. Sil | 1 | 1 | 2 |
| 2 | 4 | 10% Copo B + 10% Cymel 303 + 2.5% SDS + .7% Fl. Surf. + 4% C. Sil | 1 | 1 | 1 |
| 2 | 5 | 10% Copo B + 10% Cymel 303 + 2.5% SDS + .7% Fl. Surf. + 4% 1060 No. C.T. | 1 | 1 | 1 |
| 2 | 6 | 10% Copo B + 10% Cymel 303 + 1.0% SDS + .7% Fl. Surf. + 4% C. Sil | 3 | 1 | 3 |
| 2 | 7 | 10% Copo B + 10% Cymel 303 + .7% Fl. Surf. + 4% C. Sil | 3 | 3 | 3 |
| 2 | 8 | 10% Copo B + 10% Cymel 303 + 2.5% SLS + .7% Fl.Surf + 4% C. Sil | 1 | 1 | 1 |
| 2 | 9 | 10% Copo B + 10% Resimene 717 + 2.5% SDS + .7% Fl. Surf. + 4% C. Sil | 1 | 1 | 1 |
| 2 | 10 | 10% Copo B + 10% Resimene AQ-7550 + 2.5% SDS + .7% Fl. Surf. + 4% C. Sil | 1 | 1 | 1 |
| 2 | 11 | 10% Copo B + 1% Cymel 303 + 2.5% SDS + .7% Fl. Surf. + 4% C. Sil | 2 | 1 | 2 |
| 2 | 12 | 10% Copo B + 5% Cymel 303 + 2.5% SDS + .7% Fl.Surf + 4% C. Sil | 1 | 1 | 1 |
| 2 | 13 | 10% Copo B + 15% Cymel 303 + 2.5% SDS + .7% Fl.Surf + 4% C. Sil | 1 | 1 | 1 |
| 2 | 14 | 1% Copo B + 10% Cymel 303 + 2.5% SDS + .7% Fl.Surf + 4% C. Sil | 1 | 1 | 2 |
| 2 | 15 | 5% Copo B + 10% Cymel 303 + 2.5% SDS + .7% Fl.Surf + 4% C. Sil | 1 | 1 | 1 |
| 2 | 16 | 15% Copo B + 10% Cymel 303 + 2.5% SDS + .7% Fl.Surf + 4% C. Sil | 1 | 1 | 1 |
| 3 | 17 | 10% Copo C + 10% Cymel 303 + 2.5% SDS + .7% Fl.Surf + 4% C. Sil | 1 | 3 | 1 |
| 3 | 18 | 10% Copo C + 2.5% SDS + 4% C. Sil | 3 | 3 | 3 |

SDS = SODIUM DODECYLBENZENE SULFONATE
SLS = SODIUM LAURYL SULFATE
FL. SURF = FLUORO SURFACTANT
C. SIL = COLLOIDAL SILICA

EXAMPLE 4

This Example determines the effect of the polyfunctional aziridine without the application of a gel subbing layer.

From Examples 2 and 3, certain samples were repeated, namely: Sample 4, the standard formulation which had excellent results, Sample 6 having 1% by weight anionic surfactant, Sample 7 having no anionic surfactant, and Samples 17 and 18 having copolymer C composition. To these primer coated films, a deionized water solution containing polyfunctional aziridine at 2% by weight solids and Triton X-200, an anionic surfactant at 0.15% by weight solids, was applied with a #8 Meyer Rod to each of the primed films. The films were dried in a forced air oven at 100° C. for 45 seconds. The aziridine coated film was overcoated with the Photographic Test Coating with a #23 Meyer Rod. The Test Coating was air dried and cured for 1 hour at 50° C. before adhesion. The results are set forth in Table 2 below.

TABLE 2

| Retested Sample | Formulation | Dry Adhesion | Wet Adhesion | Processed Dry Adhesion |
|---|---|---|---|---|
| 4 | 10% Copo B, 10% Cymel + 2.5% SDS + 0.7% Fl. Surf + 4% C. Sil | 1 | 1 | 1 |
| 6 | Copo B, 10% Cymel + 1% SDS + 0.7% Fl. Surf + 4% C. Sil | 1 | 1 | 2 |
| 7 | 10% Copo B + 10% Cymel + 0% SDS, + 0.7% Fl. Surf + 4% C. Sil | 2 | 1 | 2 |
| 17 | 10% Copo C + 10% Cymel + 2.5% SDS + 0.7% Fl. Surf + 4% C. Sil | 1 | 1 | 1 |
| 18 | 10% Copo C + 2.5% SDS 4% C. Sil | 3 | 2 | 3 |

Retested Sample 6 compared with original Sample 6 had improved results with respect to dry adhesion and processed dry adhesion. Sample 7 having no anionic surfactant in the primer coating composition improved with the aziridine overcoating, however the results are still not totally acceptable. This demonstrates, however, that one skilled in the art could optimize the primer coating composition to achieve the best results.

With respect to retested Sample 17, having an overcoating of aziridine and the standard portion of Cymel, excellent adhesion was achieved for all the tests. Previously, original Sample 17 did not pass the wet adhesion test. With respect to Sample 18, the wet adhesion improved with the aziridine overcoating. However, this formulation of primer coating composition with the aziridine still was unsatisfactory.

EXAMPLE 5

All prior Examples relate to varying the primer coating composition. In this Example, the Sample 4 formulation for the primer coating was employed. Overcoated on the Sample 4 primer coating was a gelatin/aziridine coating. This coating consisted of 2% gelatin solids, with the remainder being distilled water. The gelatin employed for this Example was a Kind & Knox pork skin gelatin Type A-192. The percentages of the aziridine varied in each sample from 0 to 100% by weight based upon the weight of the gelatin. Additionally, a sample was run with no gelatin, but with an aziridine overcoating. Each of these samples was again overcoated with the Photographic Test Coating gelatin. For ease of handling, the aziridine was dissolved in isopropyl alcohol. Typically, a 50% solution of aziridine and isopropyl alcohol was prepared to blend with the gel solution. The gel solution contained a sufficient amount of ammonia, for example, to create an alkaline solution having a pH range of from about 9.0 to 9.5. The alkaline solution increases the pot life of the aziridine. Additionally, the aziridine gelatin subcoating contained 7% by weight as a percentage of gelatin solids of an anionic surfactant Triton X-200 made by Union Carbide as a coating aid to help wetting, leveling, etc. The gelatin aziridine solution was coated on the primed film using a #8 Meyer Rod. The primed and subbed film was then dried at 100° C. for 45 seconds before it was overcoated with the Photographic Test Coating.

Each of the coated samples was tested under the three adhesion tests previously described. The results of those tests are set forth in Table 3.

TABLE 3

| Sample Number | Formulation | Dry Adhesion | Wet Adhesion | Process Dry Adhesion |
|---|---|---|---|---|
| 1 | 2% gel solids, 1% aziridine based on the weight of the gel | 1 | 1 | 1 |
| 2 | 2% gel solids, 3% aziridine | 1 | 1 | 1 |
| 3 | 2% gel solids, 5% aziridine | 1 | 1 | 1 |
| 4 | 2% gel solids, 10% aziridine | 1 | 1 | 1 |
| 5 | 2% gel solids, 20% aziridine | 1 | 1 | 1 |
| 6 | 2% gel solids, 50% aziridine | 1 | 1 | 1 |
| 7 | 2% gel solids, 100% aziridine | 1 | 1 | 1 |
| 8 | no gel solids, 2% aziridine | 1 | 1 | 1 |
| 9 | 2% gel solids, 0% aziridine | 1 | 3 | No coating left to test |

TABLE 3-continued

| Sample Number | Formulation | Dry Adhesion | Wet Adhesion | Process Dry Adhesion |
|---|---|---|---|---|
| | | | | test |

EXAMPLE 6

Example 5 demonstrated that a uniform mixture of a Type A gelatin and aziridine made an excellent subbing layer for a Photographic Test Coating overcoating. The acid processed Type A subbing gelatin was produced by. Kind & Knox Co. The Photographic Test Coating contained a Type B lime processed gelatin. This Example determines whether the gelatin subbing layer and aziridine must be uniformly mixed, or whether they can be applied individually. In this Example, a 2% gelatin subbing coating was applied on the primed film (using the primer coating composition of Sample 4 in Example 2) with a #8 Meyer Rod. The 2% gelatin solution contained a small amount of an anionic surfactant with the distilled water. The gelatin sublayer was dried at 100° C. for 45 seconds. After drying, an aziridine aqueous based coating was overcoated on the gel subbing layer with a #8 Meyer Rod. The aziridine overcoating was a 0.1% solution having a pH (due to a small amount of ammonia added) of 9.5. On a dry basis, the aziridine overcoating would be 5% by weight, based upon the weight of the gelatin sublayer. The aziridine overcoating was dried at 100° C. for 45 seconds. Overcoated on the aziridine layer was the Photographic Test Coating composition. When the Photographic Test Coating composition dried, it was tested for the three adhesion tests as described above. For each of the adhesion tests, the result was a grade 1, indicating excellent adhesion.

EXAMPLE 7

In this Example, a primed film was overcoated with a Type B lime processed bone gelatin Photographic Test Coating containing aziridine. The Type B gelatin was manufactured by Croda Co. The polyester film was primed with the primer coating composition described in Sample 4 of Example 2. To the Photographic Test Coating, was added a 3% by weight of aziridine, (based upon the weight of the gelatin) at its natural pH (approximately a pH of 5.5–5.7). The blend of aziridine and Photographic Test Coating gelatin was coated on the primer coated film using a #23 Meyer Rod. When the coating dried, it was tested for the three adhesion tests previously described. A grade 1 was achieved by each test.

This Example demonstrates that various gelatin subbing layers may not be necessary with the present invention. It may be desirable, depending upon the desired characteristics of the photographic film, to eliminate the gelatin sublayers and merely uniformly blend the aziridine directly with the gelatin photographic composition by applying it to the primer coated film of the present invention, after the primed film has been heat set.

Thus, it is apparent that there has been provided, in accordance with the invention, a primer coating, a primer coated film, a primed film coated with a gelatin composition, and a process for producing a photographic film that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the present invention.

What is claimed is:

1. A primer coating composition for photographic, reprographic and xerographic film which comprises, on a dry basis,
   a) from about 85% to about 99% by weight of a water-dispersible copolyester comprising Yore about 80 to about 98 mol percent of at least one dicarboxylic acid or ester thereof, from about 2 to about 20 mol percent of at least one sulfomonomer containing a sulfonate group attached to a dicarboxylic nucleus, and about 100 mol percent of at least one glycol having from 2 to 11 carbon atoms, and
   b) from about 1% to about 15% of an anionic surfactant.

2. A composition according to claim 1 wherein the anionic surfactant is selected from the group consisting of sodium lauryl sulfate, sodium dodecylbenzene sulfonate and sodium alkylarylpolyether sulfonate.

3. A composition according to claim 1 wherein the dicarboxylic acid is selected from the group consisting of terephthalic, isophthalic, phthalic, malonic, adipic, azelaic, glutaric, sebacic, suberic, succinic and brassylic acids and mixtures thereof, the sulfomonomer is selected from the group consisting of ammonium sulfoterephthalic acid, alkali metal sulfoterephthalic acid, ammonium 5-sulfoisophthalic acid, alkali metal 5-sulfoisophthalic acid, ammonium sulfophthalic acid, alkali metal sulfophthalic acid, 5-(p-sodiosulfophenoxy)-isophthalic acid, 5-(sulfopropoxy)isophthalic acid, sodium salt, sulfopropyl malonic acid and sulfonated succinic acid and the glycol is selected from the group consisting of ethylene glycol, butanediol, 1,5-pentanediol, 1,6-hexanediol, neopentyl glycol, 1, 10-decanediol, cyclohexanedimethanol and diethylene glycol.

4. A composition according to claim 3 wherein the range of the components is 2 to 3%, by weight, of anionic surfactant and 97 to 98%, by weight, of water-dispersible copolyester.

5. The primer coating composition of claim 1, wherein said dicarboxylic acid is selected from the group consisting of of terephthalic acid, isophthalic acid, phthalic acid, malonic, adipic, azelaic, glutaric, sebacic, suberic, succinic, brassylic, and mixtures thereof.

6. The primer coating composition of claim 1, wherein said sulfomonomer is represented by the formula:

wherein M is a monovalent cation selected from the group consisting of alkali metal, ammonium, substituted ammonium, and quaternary ammonium; Z is a trivalent radical; and X and Y are carboxyl groups or polyester forming equivalents.

7. The primer coating composition of claim 6, wherein said sulfomonomer is selected from the group consisting of ammonium sulfoterephthalic acid, alkali metal sulfoterephthalic acid, ammonium 5-sulfoisophthalic acid, alkali metal 5-sulfoisophthalic acid, ammonium sulfophthalic acid, alkali metal sulfophthalic acid, 5-(p-sodiosulfophenoxy) isophthalic acid, and 5-(sulfopropoxy)isophthalic acid, sodium salt.

8. The primer coating composition of claim 1, wherein said glycol is selected from the group consisting of ethylene glycol; butanediol; 1,5-pentanediol; 1,6-hexanediol; neopentyl glycol; 1,10-decanediol; cyclohexanedimethanol; and diethylene glycol.

9. A composition according to claim 6 wherein Z is a trivalent aromatic or aliphatic radical and the dicarboxylic acid is selected from the group consisting of terephthalic, isophthalic, phthalic, malonic, adipic, azelaic, glutaric, sebacic, suberic, succinic and brassylic acids and mixtures thereof and the glycol is selected from the group consisting of ethylene glycol, butanediol, 1,5-pentanediol, 1,6-hexanediol, neopentyl glycol, 1,10-decanediol, cyclohexanedimethanol and diethylene glycol.

10. A composition according to claim 9 wherein the anionic surfactant is selected from the group consisting of sodium lauryl sulfate, sodium dodecylbenzene sulfonate and sodium alkylarylpolyether sulfonate.

11. A composition according to claim 10 wherein the range of the components is 2 to 3%, by weight, of anionic surfactant and 97 to 98%, by weight, of water-dispersible copolyester.

12. A composition according to claim 1 wherein the range of the components is 2 to 3%, by weight, of anionic surfactant and 97 to 98%, by weight, of water-dispersible copolyester.

13. A composition according to claim 12 wherein the sulfomonomer is 5-sodium sulfoisophthalate.

14. A composition according to claim 1 wherein the sulfomonomer is 5-sodium sulfoisophthalate.

15. A composition according to claim 14 wherein the copolyester comprises 90 mol % isophthalic acid, 10 mol % 5-sodium sulfoisophthalate and 100 mol % ethylene glycol.

* * * * *